United States Patent [19]

Vanaschen et al.

[11] Patent Number: 4,842,634
[45] Date of Patent: Jun. 27, 1989

[54] METHOD AND APPARATUS FOR CURVING A GLASS SHEET

[75] Inventors: Luc Vanaschen, Eupen, Belgium; Hans-Werner Kuster, Aachen, Fed. Rep. of Germany; Herbert Radermacher, Raeren, Belgium

[73] Assignee: Saint-Gobain Vitrage, Courbevoie, France

[21] Appl. No.: 122,851

[22] Filed: Nov. 19, 1987

[30] Foreign Application Priority Data

Nov. 29, 1986 [DE] Fed. Rep. of Germany ....... 3640892

[51] Int. Cl.$^4$ ............................................ C03B 23/025
[52] U.S. Cl. ........................................ 65/106; 65/107; 65/273; 65/289
[58] Field of Search .................. 65/106, 107, 273, 289

[56] References Cited

U.S. PATENT DOCUMENTS

| | | | |
|---|---|---|---|
| 3,309,190 | 3/1967 | Belentepe et al. | 65/107 X |
| 3,573,889 | 4/1971 | McMaster et al. | 65/273 X |
| 4,204,854 | 5/1980 | McMaster et al. | 65/273 X |

Primary Examiner—Arthur Kellogg
Attorney, Agent, or Firm—Oblon, Fisher, Spivak, McClelland & Maier

[57] ABSTRACT

The invention relates to a method of manufacturing a curved automobile glass pane. The glass sheet heated in a continuous roller conveyor furnace to bending temperature, is picked up by a traveling suction device and transported to a curving station adjoining the furnace. In the curving station the glass sheet is deposited onto a curving device which is comprised of a curving-form frame and a curving form which form occupies the interior space of the frame. The suction device is withdrawn, and a hot gas stream is applied from above, which stream impinges on the glass sheet, whereby said sheet is forced against the curving device comprised of the curving-form frame and interior curving form. Then the glass sheet is lifted from the interior curving from by means of the curving-form frame which frame now serves as a support ring, and sheet is transported to the neighboring cooling station.

10 Claims, 3 Drawing Sheets

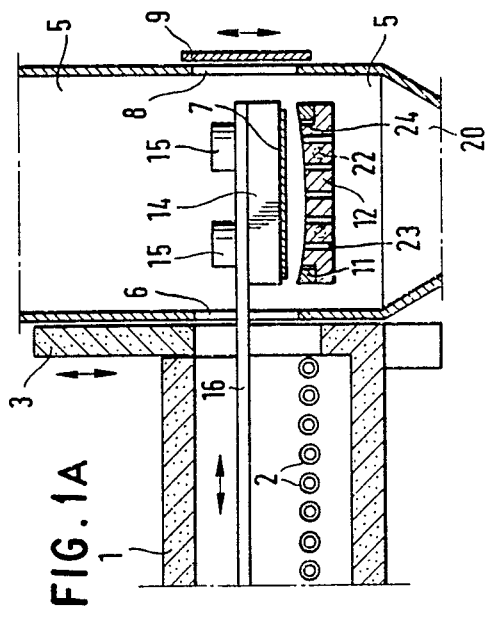
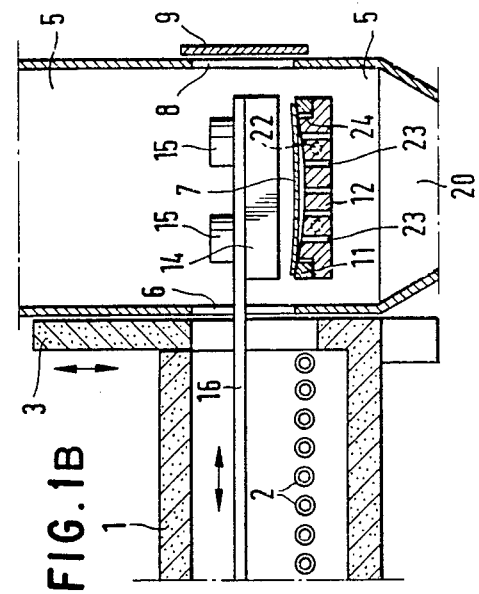
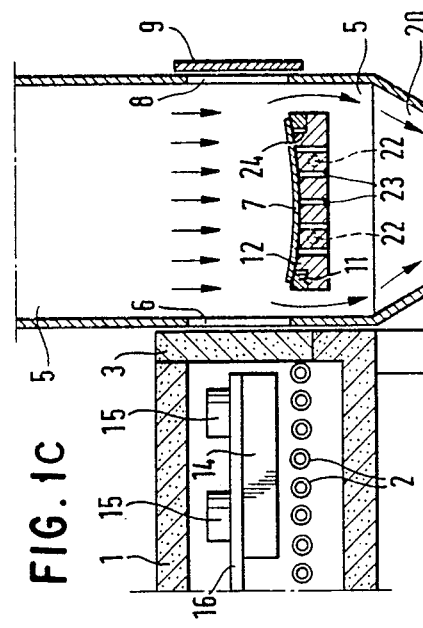
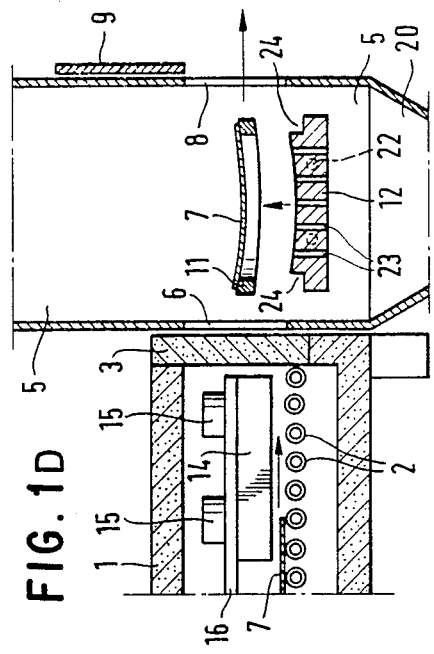

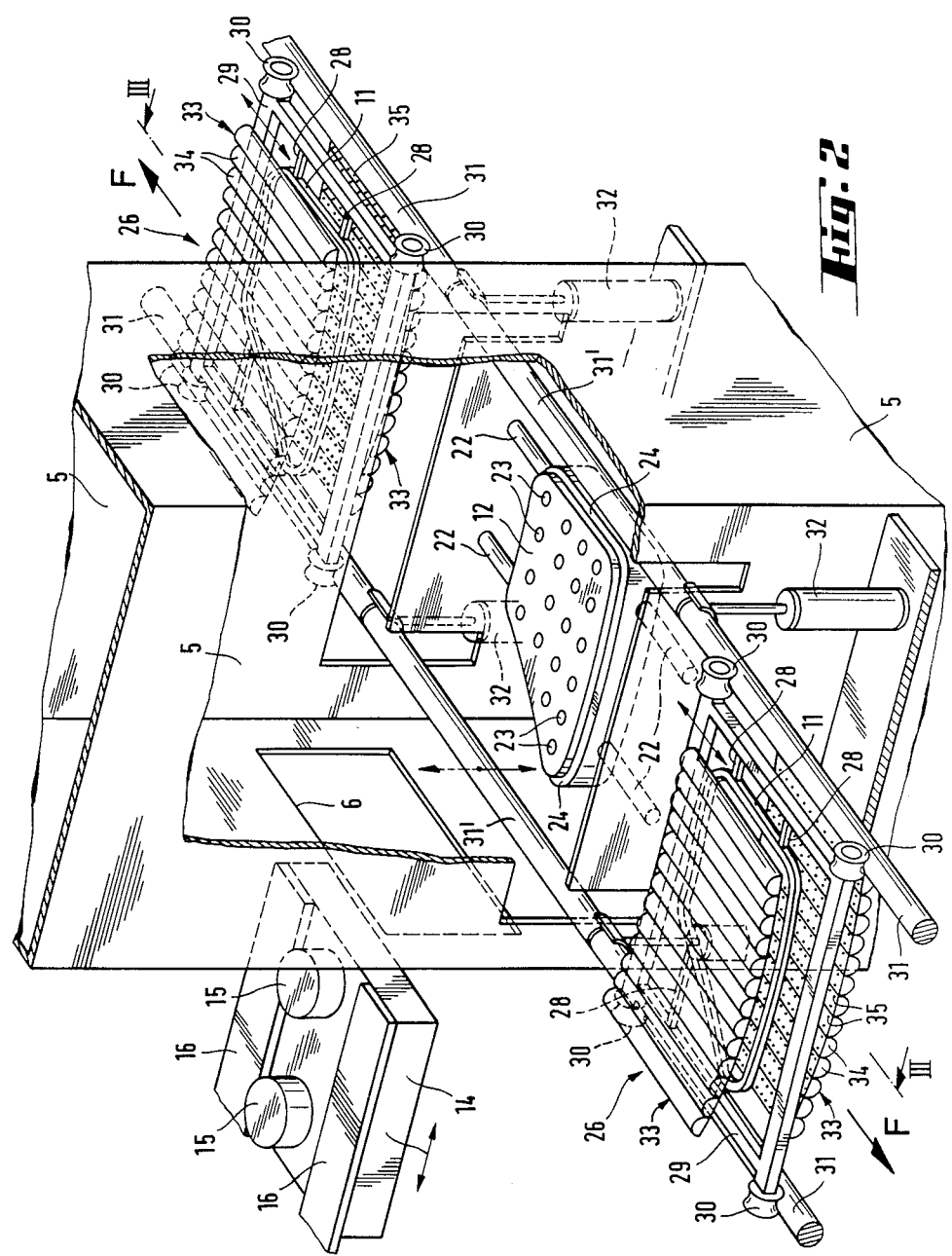

METHOD AND APPARATUS FOR CURVING A GLASS SHEET

BACKGROUND OF THE INVENTION

1. Field of the Invention

The invention relates to a method for curving a glass sheet, wherein the glass sheet is heated to bending temperature, is engaged in a horizontal attitude by an overhead suction device, is transported to a location above a curving-form frame which defines contour of the glass sheet, and is deposited onto the said frame, wherewith the glass sheet takes on the shape of the frame on its (the glass sheet's) perimeter, and the said frame subsequently transports the glass sheet to a cooling station.

2. Background of the Prior Art

Method of this type are described in German Pat. No. 2,945,776 and Europe A1 No. 0 003 391. The furnace in which the glass sheet is heated to bending temperature is preferably a horizontal pass-through (continuous) furnace in which the glass sheet is conveyed through the furnace while resting on rollers or on a gas cushion. A suction device which can be raised and lowered is disposed at the end of the furnace. The suction plate of the suction device is flat or slightly curved. The said plate is lowered to the heated glass sheet, which it aspirates and said plate is then raised again. A curving-form frame is then moved under the raised glass sheet. As soon as the frame is positioned under the glass sheet, the vacuum in the suction device is released, so that the glass sheet falls onto the curving-form frame, and comes to rest intimately against said frame by virtue of its (the glass sheet's) kinetic energy and weight. The curving-form frame with the glass sheet is then conveyed to a cooling station neighboring the curving station, where it is tempered (prestressed), e.g., by rapid cooling with air jets.

This known method has various drawbacks. These include, in particular, the fact that the action of gravity and/or the kinetic energy of falling on the glass sheet causes said sheet to sag in the curving-form frame in an uncontrollable fashion, so that, e.g., it is impossible to effect a purely cylindrical curvature. Further, only more or less weak curvatures can be produced, because the bending forces achievable are limited by the height of fall and the weight of the glass sheet.

The underlying problem of the present invention is to devise a curving method of the general type described initially supra, which does not result in undesired sagging in the curving-form frame, and which enables the glass sheet to be more strongly curved than is possible when relying only on the weight of the sheet or on the kinetic energy of falling of the sheet.

SUMMARY OF THE INVENTION

This problem is solved according to the invention in that during the curving process the glass sheet is supported by a curving form which fills the interior space of the curving-form frame and matches the desired configuration of the glass sheet; and in that the glass sheet is pressed against the combined curving form device (comprised by the curving-form frame and the inner curving form) by blowing a stream of hot gas from above onto the glass sheet.

Thus, it may be said that in the inventive method the curving-form frame is replaced by a two-piece solid form, and the bending forces are exerted uniformly over the entire glass sheet by a hot gas stream flowing at an intensity which is sufficient to press the entire glass sheet against the forming surface of the entire solid form, even in the case of strong and complex curvatures. In this way, one avoids all undesired sagging yet one is able to employ sufficiently high bending forces. Following the curving process, the inner curving form is separated from the curving-form frame, and the process may be continued in known fashion, with the curving-form frame now (as in the known method) serving as a conveying frame to convey the glass sheet to the subsequent cooling station.

In general, it is possible to embody the inventive method such that the glass sheet is curved over a form the shape of which is upwardly convexly curved, or such that the glass sheet is pressed into a form the shape of which is downwardly concavely curved. For certain shapes, it is more advantagous to employ a concave form into which the glass sheet is pressed, while other shapes can be produced using an upwardly convex form, with equally good results in either case.

In the following, the inventive method and a preferred embodiment of a device for carrying out said method will be described with reference to the drawings. The said preferred embodiment does not limit the scope of the inventive.

BRIEF DESCRIPTION OF THE INVENTION

FIGS. 1A–1D illustrate the main sequence of events in the inventive method;

FIG. 2 is a perspective view of an apparatus for curving a glass sheet according to the inventive method, and for the subsequent pre-stressing.

FIGS. 1A–1D illustrate the successive steps of a preferred embodiment of the inventive method. The views are longitudinal cross sections through the end region of a pass-through (continuous) heating furnace and the adjacent curving station.

Figure 3:
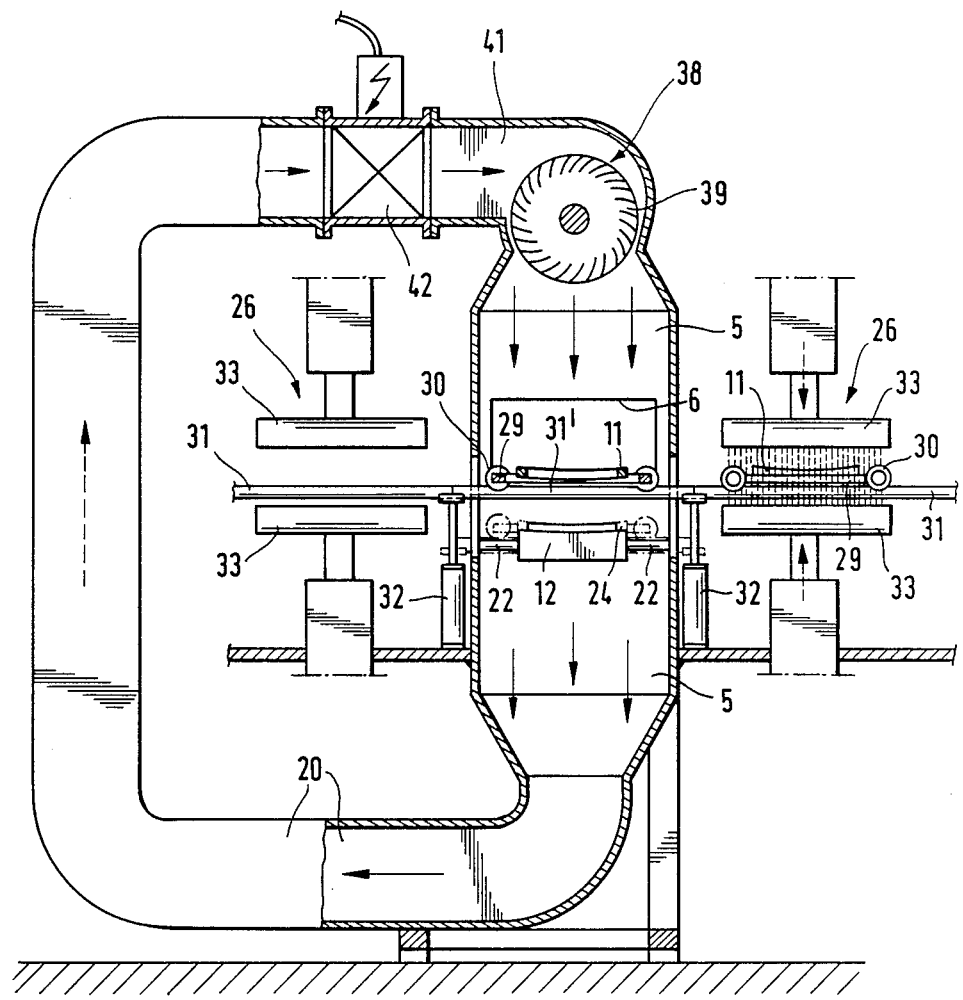
FIG. 3 is a cross section through the apparatus shown in cutaway view in FIG. 2, through the line III—III of FIG. 2.

The apparatus for carrying out the method essentially comprises a horizontal pass-through furnace 1 wherein the glass sheets are heated to the required bending temperature of c.650° C. while in a horizontal attitude on a conveyor comprised of driven conveyor rollers 2. The end of the furnace 1 can be closed off by a vertically raisable door 3. Immediately following the furnace 1 is a vertical flow channel 5 through which a hot gas stream, particularly an air stream, flows from the top downward when the subject curving process is being carried out. Flow channel 5 has an opening 6 through which the heated glass sheet 7 is admitted into the channel 5, and an opening 8 which can be closed off by a door 9, through which opening 8 the glass sheet is moved out of the channel 5 and into the subsequent cooling station after the curving has been completed.

The curving device is disposed below the conveying plane of the glass sheet 7, in the flow channel 5. This curving device is comprised of a curving-form frame 11 and a curving form 12 disposed in the frame 11. The curving-form frame 11 and the curving form 12 therein match each other such that in combination they form the forming surface against which the heated glass sheet 7 is pressed. The curving-form frame 11 is capable of being separated from the curving form 12. After the curving of the glass sheet has been completed, the frame 11 serves as a support ring to carry the curved glass sheet to the subsequent cooling station.

According to a first embodiment, the inner curving form is disposed in a fixed position within the flow channel, e.g., with said aid of the horizontal crossbars 22. The curving-form frame 11 is mounted such that it can be moved in a horizontal direction between the curving station and the adjoining cooling station, and can also be moved vertically up and down in the curving station, between a lower position (in which it cooperates with the curving form 12) and an upper position (in which it can be translated horzontally). According to a second embodiment, the inner curving form 12 is mounted so as to be capable of being moved up and down within the flow channel 5, and the curving-form frame 11 is movable only in the horizontal direction.

In order to move the heated glass sheet 7 from the furnace 1 into the curving station (in the flow channel 5), a suction device is provided, e.g., in the form of a suction plate 14, which can be moved horizontally. Suction pumps 15 are disposed on this suction plate 14, to produce the required suction within suction plate 14. Suction plate 14 is disposed on rails 16 whereby it can be moved between the position above the curving device (11, 12) and a position in the heating furnace 1.

The curving process as follows: The glass sheet heated to bending temperature in the heating furnace 1 is lifted off the conveyor rollers 2 with the aid of the suction plate 14. Then the sliding door 3 is opened, and the suction plate 14 with the glass sheet 7 is moved through the opening 6 into the flow channel 5, into a position above the curving device (11, 12). This stage is illustrated in FIG. 1A.

When the suction plate 14 with the glass sheet 7 has reached its exact position above the curving device (11, 12), the suction in the suction plate 14 is released. This results in the glass sheet 7 being deposited on the external curving-form frame 11. The glass sheet shows some sagging at this stage, under its own weight (Position 1B). Immediately after the glass sheet 7 is deposited on the curving device, the suction plate 14 is withdrawn to its original position in the furnace 1 and the sliding door 3 is closed.

Now a hot air stream with temperature c.650° C. is directed downward from above in the flow channel 5 onto the glass sheet 7 which is lying on the curving device. The volumetric flow and pressure of the gas stream are set in accordance with the thickness, the temperature, and desired shape of the glass sheet, such that the glass sheet is pressed closely against the curving-form frame 11 and the inner curving form 12, under the action of the gas stream (Position 1C). During the time of the action of the hot gas stream, the openings 6 and 8 of the flow channel 5 remain closed by the sliding doors 3 and 9. The hot gas stream passes into a conduit 20 below the curving device (11, 12), and is recycled into the flow channel 5.

When the glass sheet 7 has been pushed closely against the forming surface of the curving device (11, 12), the hot gas stream is interrupted. Then the curving-form frame 11 is lifted (Position 1D). The door 9 is then opened and the glass sheet 7 is moved out of the channel 5 through the opening 8, and into a nearby cooling station, with the aid of the curving-form frame 11 (which is now serving as a conveying or supporting ring). The cooling station may comprise a pass-through (continuous) cooling furnace, in which the glass sheet is slowly cooled. The cooling station may comprise, in particular, a pre-stressing station, wherein the glass sheet is thermally pre-stressed by means of rapid cooling, e.g., with cooling air.

FIGS. 2 and 3 illustrate an apparatus for producing curved and thermally pre-stressed glass sheets, e.g., automobile panes from single safety glass. The flow channel 5 is comprised of a housing with rectangular cross section, which housing is disposed vertically, immediately beyond a horizontal pass-through furnace (furnace not shown, for the sake of graphic clarity). The suction plate 14 provided with suitable suction pumps 15 is shown in a rest position within the said furnace. The suction plate 14 can enter the flow channel 5 through the opening 6, to convey the glass sheet from the heating furnace to the flow channel, there to deposit the glass sheet on the curving device.

The inner curving form of the curving device is disposed in the lower part of the flow channel. It is fixed there with the aid of crossbars 22. The forming surface of the curving form 12 against which surface the glass sheet is pressed has a shape which matches the desired shape of the glass sheet. The curving form 12 is provided with a set of perforations 23 through which the air between the glass sheet and the surface of the form can escape during the pressing process. Advantageously, these perforations 23 are connected to a chamber (not shown) disposed below the curving form 12. At the end of the curving process this chamber may be briefly pressurized, if necessary, so as to cause the glass sheet to release from the curving form with the aid of gas expelled from the perforations 23. A step-like recess 24 is provided along the perimeter of the curving form 12, in which recess the curving-form frame 11 is accommodated during the curving process.

In the apparatus illustrated, on either side of the flow channel 5 transverse to the longitudinal direction of the heating furnace a pre-stressing station 26 is provided, so that two curving-form frames 11 can pick up respective glass sheets alternately and carry them to the associated pre-stressing stations. Each curving-form frame 11 is attached to a conveying frame 29 by lateral (horizontal) bars 28. Each such conveying frame 29 is movable on rails 31 with the aid of wheels 30, the movement being namely between the curving station in the flow channel and the respective pre-stressing station.

The rails 31 are fixed in place in the prestressing station. The middle segment 31' of the rails in the region of the flow channel 5 is not fixed, however, but is capable of being raised and lowered, to lower the curving-form frame 11 into the step-like recess 24 in the curving form 12, and to raise the glass sheet after the curving process, namely to raise it to the level of the fixed rails 31. Pneumatic or hydraulic cylinders 32 are provided outside the flow channel 5, to raise and lower the rail segments 31'.

The pre-stressing stations 26 are of the ordinary configuration, having a respective blowing unit 33 disposed above and below the conveying plane of the curved glass sheet. Each blowing unit 33 is comprised of, e.g., a row of tubes 34 having blow openings 35 in their surfaces facing the glass sheet. After the prestressing process in the pre-stressing station 26, the pre-stressed glass sheet is conveyed by the conveying frame 29 in the direction of arrow F, to a subsequent unloading station where the glass sheet is removed from the curving-form frame 11. The curving-form frame 11 is then ready for a new curving process.

The means of producing the hot gas stream are illustrated in FIG. 2 which shows a vertical cross section through the line III—III of the apparatus shown in FIG. 2. A transverse blower 38 with a rotor 39 in the form of an impeller wheel is employed in producing the hot gas stream. The stream has large flow cross section and a homogeneous flow field, and is therefore particularly suitable for the purpose at hand. At the bottom the flow channel 5 undergoes a transition into a tubular conduit 20, through which the gas is recycled to the intake channel 41 of the blower 39. There is a channel segment 42 upstream of the intake channel 41, which segment 42 is provided with an electrical heat radiating means, to heat the gas stream to the required temperature of c.650° C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for curving a glass sheet, comprising heating the glass sheet to a bending temperature,
   engaging the heated glass sheet in a horizontal attitude with an overhead suction device,
   transporting it to a location above a curving-form frame the surface of which corresponds to the desired contour of the glass sheet,
   ending the suction so as to deposit the glass sheet onto said frame,
   allowing the perimeter of the glass sheet to take on the shape of the frame,
   simultaneously providing a curving form which fills the interior space of the curving-form frame the surface of which corresponds to the desired configuration of the glass sheet,
   continuing to curve the glass sheet against the combined curving-form means by blowing a stream of hot gas under pressure from above onto the glass sheet until said sheet conforms to the surface of said combined curving means,
   subsequently separating the frame from the curving form and transporting the glass sheet to a cooling station.

2. A method according to claim 1, wherein with the aid of the hot gas stream, the glass sheet is formed over a curving form means having an upwardly convexly curved curving surface, which form means is comprised of a combination of the curving form frame and the inner curving form.

3. A method according to claim 1, wherein with the aid of the hot gas stream, the glass sheet is curved over a curving form means having a downwardly concavely curved curving surface, which form means is comprised of a combination of the curving form frame and the curving form.

4. An apparatus for curving a glass sheet, comprising means for heating the glass sheet to a bending temperature, means for applying suction to said glass sheet from above, said section means being capable of transporting said sheet, in a horizontal attitude, to a curving form means,
   said curving form means comprising a separable curving form frame the surface of which corresponds to the desired contour of the glass sheet and a curving form which fills the interior space of said curving form frame, the surface of which curving form corresponds to the desired configuration of said glass sheet,
   means for directing a hot gas stream from above onto said curving form means, and
   means for separating said curving form frame from said curving form, and advancing said frame to a cooling means.

5. An apparatus according to claim 4, wherein the inner curving form is disposed fixed and the curving-form frame is raisable and lowerable and when in the raised position is movable horizontally.

6. An apparatus according to claim 5, wherein the curving-form frame is disposed in a conveying frame which is movable on wheels, wherewith said curving-form frame can be moved on rails, and wherewith the segments of said rails in the region of the flow channel are movable into an upper and a lower end position.

7. An apparatus according nto claim 4; wherein the curving-form frame can be moved in a horizontal direction between one end position under the hot gas stream and another end position in a cooling station and wherein the inner curving form is raisable and lowerable between an end position determined by the cooperation of said curving form and the curving-form frame, and a second end position which enables the curving-form frame to be moved horizontally.

8. An apparatus according to claim 4, wherein the curving-form frame and the inner curving form together form a forming surface which is upwardly convexly curved.

9. An apparatus according to claim 4, wherein the curving-form frame and the inner curving form together form a forming surface which is downwardly concavely curved.

10. An apparatus according to claim 9, wherein the inner curving form is provided with openings or the like to allow escape of air in the intermediate space between the glass sheet and the forming surface during the curving process.

* * * * *